(12) United States Patent
Kagami et al.

(10) Patent No.: US 9,859,718 B2
(45) Date of Patent: Jan. 2, 2018

(54) POWER SUPPLY UNIT, POWER RECEIVING UNIT, AND POWER SUPPLY SYSTEM

(71) Applicant: Yazaki Corporation, Tokyo (JP)

(72) Inventors: Kazuyoshi Kagami, Susono (JP); You Yanagida, Susono (JP); Shingo Tanaka, Yokosuka (JP); Hajime Terayama, Susono (JP)

(73) Assignee: Yazaki Corporation, Tokyo (JP)

( * ) Notice: Subject to any disclaimer, the term of this patent is extended or adjusted under 35 U.S.C. 154(b) by 367 days.

(21) Appl. No.: 14/697,960

(22) Filed: Apr. 28, 2015

(65) Prior Publication Data

US 2015/0244181 A1 Aug. 27, 2015

Related U.S. Application Data

(63) Continuation of application No. PCT/JP2013/079583, filed on Oct. 31, 2013.

(30) Foreign Application Priority Data

Nov. 1, 2012 (JP) ................................ 2012-241628
Mar. 6, 2013 (JP) ................................ 2013-044276

(51) Int. Cl.
*H01F 27/42* (2006.01)
*H02J 5/00* (2016.01)
(Continued)

(52) U.S. Cl.
CPC .............. *H02J 5/005* (2013.01); *H01F 27/36* (2013.01); *H01F 38/14* (2013.01); *H02J 7/0052* (2013.01); *H02J 17/00* (2013.01); *H02J 7/025* (2013.01)

(58) Field of Classification Search
None
See application file for complete search history.

(56) References Cited

U.S. PATENT DOCUMENTS 8,912,687 B2 * 12/2014 Kesler .................. B60L 11/182
307/10.1
2009/0096413 A1 * 4/2009 Partovi ................... H01F 5/003
320/108
(Continued)

FOREIGN PATENT DOCUMENTS

CN 102349214 A 2/2012
CN 102656648 A 9/2012
(Continued)

OTHER PUBLICATIONS

Office Action drafted Oct. 13, 2016, issued for the Japanese patent application No. 2013-044276 and English translation thereof.
(Continued)

*Primary Examiner* — Lincoln Donovan
*Assistant Examiner* — Khareem E Almo
(74) *Attorney, Agent, or Firm* — Locke Lord LLP

(57) ABSTRACT

Provided is a power supply system in which an electromagnetic leakage is prevented. A power supply side resonance coil provided to a power supply unit and a power receiving side resonance coil provided to a power receiving unit are housed respectively in a conductive power supply side shield case and power receiving side shield case. The power supply side shield case is formed of a bottom wall covering a side of the power supply side resonance coil spaced apart from the power receiving side resonance coil and a vertical wall erecting from a periphery of the bottom wall, and a ferrite is provided onto surfaces of the bottom wall and the vertical wall.

7 Claims, 8 Drawing Sheets

PRESENT INVENTION
PRODUCT A

(51) Int. Cl.
*H01F 27/36* (2006.01)
*H01F 38/14* (2006.01)
*H02J 17/00* (2006.01)
*H02J 7/00* (2006.01)
*H02J 7/02* (2016.01)

(56) References Cited

U.S. PATENT DOCUMENTS

| | | | | |
|---|---|---|---|---|
| 2011/0018667 A1* | 1/2011 | Jaeger | ............... | B60C 23/0413 |
| | | | | 336/120 |
| 2011/0254377 A1* | 10/2011 | Wildmer | ............... | B60L 11/182 |
| | | | | 307/104 |
| 2014/0015329 A1* | 1/2014 | Widmer | ............... | G01D 5/2006 |
| | | | | 307/104 |
| 2014/0125140 A1* | 5/2014 | Widmer | ............... | H02J 7/025 |
| | | | | 307/104 |
| 2015/0236546 A1* | 8/2015 | Kesler | ............... | H04B 5/0037 |
| | | | | 455/573 |
| 2015/0255994 A1* | 9/2015 | Kesler | ............... | H02J 5/005 |
| | | | | 307/10.1 |
| 2015/0302984 A1* | 10/2015 | Kurs | ............... | H01F 38/14 |
| | | | | 307/104 |
| 2016/0020019 A1* | 1/2016 | Kagami | ............... | H01F 27/365 |
| | | | | 307/104 |
| 2017/0053737 A1* | 2/2017 | Kurs | ............... | H03H 7/40 |

FOREIGN PATENT DOCUMENTS

| | | |
|---|---|---|
| JP | H09-246073 A | 9/1997 |
| JP | 2011-045189 A | 3/2011 |
| JP | 2012-134374 A | 7/2012 |
| WO | WO-2011/074091 A1 | 6/2011 |

OTHER PUBLICATIONS

International Search Report dated Dec. 10, 2013, issued for PCT/JP2013/079583.
Office Action dated Aug. 2, 2016, issued for the Chinese patent application No. 2016072801758460 and English translation thereof.

* cited by examiner

PRESENT INVENTION PRODUCT A

PRESENT INVENTION PRODUCT B

PRESENT INVENTION PRODUCT C

PRESENT INVENTION PRODUCT D

POWER SUPPLY UNIT, POWER RECEIVING UNIT, AND POWER SUPPLY SYSTEM

TECHNICAL FIELD

The present invention relates to a power supply unit, a power receiving unit, and a power supply system, and particularly to a power supply unit which supplies power in a non-contact manner and a power receiving unit which receives power in a non-contact manner, and a power supply system provided with the power supply unit and the power receiving unit.

BACKGROUND ART

In recent years, a wireless power supply system in which a power supply cord or a power transmission cable is not used has been focused as a power supply system that supplies power to a battery mounted on a hybrid vehicle or an electric vehicle. In such a resonance-type power supply system, a pair of resonance coils electromagnetically resonating with one another is provided in a way such that one is installed at a ground surface of power supply equipment and the other is mounted to a vehicle so as to supply power in a non-contact manner from the resonance coil installed on the ground surface of the power supply equipment to the resonance coil mounted to the vehicle. Hereinafter, the one resonance coil installed to the power supply equipment is referred to as a power supply side resonance coil, and the other resonance coil mounted to the vehicle is referred to as a power receiving side resonance coil.

The above-described resonance type power supply system is advantageous in that power may be wirelessly supplied even when there is a certain distance between the power supply side resonance coil and the power receiving side resonance coil. However, there is a concern that a great electromagnetic leakage may be generated around the coils since there is a distance between the power supply side resonance coil and the power receiving side resonance coil.

Therefore, as illustrated in FIGS. 14 and 15, a method is considered in which metallic shield frames 103 and 104 that surround side surfaces of a power supply side resonance coil 101 and a power receiving side resonance coil 102 are provided, and, magnetic bodies 105 and 106 are disposed to each side of the power supply side resonance coil 101 and the power receiving side resonance coil 102, the sides which are separated apart from one another (Patent Literature 1) as a method of preventing such an electromagnetic leakage. However, the method has a problem that it is difficult to prevent the electromagnetic leakage sufficiently in a high-power power supply for a hybrid vehicle or an electric vehicle.

In addition, when the power receiving side resonance coil 102 is mounted to an automobile, there are some cases in which power is supplied in a state where the power supply side resonance coil 101 and the power receiving side resonance coil 102 are misaligned from each other. When power is supplied in such a state, the electromagnetic leakage further increases. Moreover, in the high-power power supply, an eddy current occurs at outer surfaces of the shield frames 103 and 104 due to the influence of the electromagnetic leakage so that an electromagnetic noise is generated therefrom, which is problematic.

CITATION LIST

Patent Literature

Patent Literature 1: JP 2011-45189 A

SUMMARY OF INVENTION

Technical Problem

Therefore, the present invention product aims to provide a power supply system in which an electromagnetic leakage is prevented.

Solution to Problem

One aspect of the present invention to solve the above-described problems lies in a power supply unit including: a power source; a power supply side resonance coil configured to resonance with a power receiving side resonance coil mounted to a vehicle to supply power supplied from the power source to the power receiving side resonance coil in a non-contact manner; and a conductive shield case formed of a bottom wall covering a side of the power supply side resonance coil spaced apart from the power receiving side resonance coil and a vertical wall erecting from a periphery of the bottom wall and housing the power supply side resonance coil, in which a magnetic body is provided onto a surface of the vertical wall of the shield case.

A first preferred aspect of the present invention lies in a power receiving unit including: a power receiving side resonance coil mounted to a vehicle and configured to electromagnetically resonate with a power supply side resonance coil to receive power from the power supply side resonance coil in a non-contact manner; and a conductive shield case formed of a bottom wall covering a side of the power receiving side resonance coil spaced apart from the power supply side resonance coil and a vertical wall erecting from a periphery of the bottom wall and housing the power receiving side resonance coil, in which a magnetic body is provided onto a surface of the vertical wall of the shield case.

A second preferred aspect of the present invention lies in a power supply system including the power supply unit according to the one aspect of the present invention and the power receiving unit according to the first preferred aspect of the present invention.

A third preferred aspect of the present invention lies in the power supply system according to the second preferred aspect of the present invention, in which the magnetic body is provided onto an outer surface of the shield case.

A fourth preferred aspect of the present invention lies in the power supply system according to the second preferred aspect or the third preferred aspect of the present invention, in which the magnetic body is further provided to the bottom wall of the shield case.

A fifth preferred aspect of the present invention lies in the power supply system according to any one of the second preferred aspect to the fourth preferred aspect of the present invention, in which the magnetic body is provided with a slit.

A sixth preferred aspect of the present invention lies in the power supply system according to the fourth preferred aspect of the present invention, in which the magnetic body is provided with a slit, central axes of the power supply side resonance coil and the power receiving side resonance coil are disposed to be perpendicular to a separation direction of the power supply side resonance coil and the power receiving side resonance coil while power is being supplied, and the slit is provided along the central axis.

Advantageous Effects of Invention

According to the one aspect to the second preferred aspect of the present invention and the fourth preferred aspect of the present invention as described above, the power supply side resonance coil and the power receiving side resonance coil are surrounded by the bottom wall and the vertical wall of the shield case and moreover, the magnetic body is provided to the vertical wall of the shield case so that it is possible to sufficiently prevent the electromagnetic leakage even in the high-power power supply system of an automobile.

According to the third preferred aspect of the present invention, the magnetic body is provided onto the outer surface of the shield case. Thus, the leakage magnetic field is converted to heat energy by the magnetic body before reaching the outer surface of the shield case, and accordingly, an eddy current does not flow to the outer surface of the shield case and the electromagnetic noise is not generated so that it is possible to more reliably prevent the magnetic field leakage. In addition, although the magnetic body becomes hot by absorbing an electromagnetic wave and converting it into the heat energy, it is possible to increase heat radiation effect of the magnetic body so as to prevent it from being too hot by providing the magnetic body to the outer surface of the shield case as described above.

According to the fifth preferred aspect of the present invention, since the slit is provided to the magnetic body, it is possible to achieve improvement in the heat radiation effect of the magnetic body.

According to the sixth preferred aspect of the present invention, the central axes of the power supply side resonance coil and the power receiving side resonance coil are disposed to be perpendicular to the separation direction of the power supply side resonance coil and the power receiving side resonance coil while power is being supplied and the slit is provided along the central axis direction so that it is possible to reliably prevent the magnetic field leakage even when the slit is provided.

DESCRIPTION OF EMBODIMENTS

First Embodiment

Figure 1:
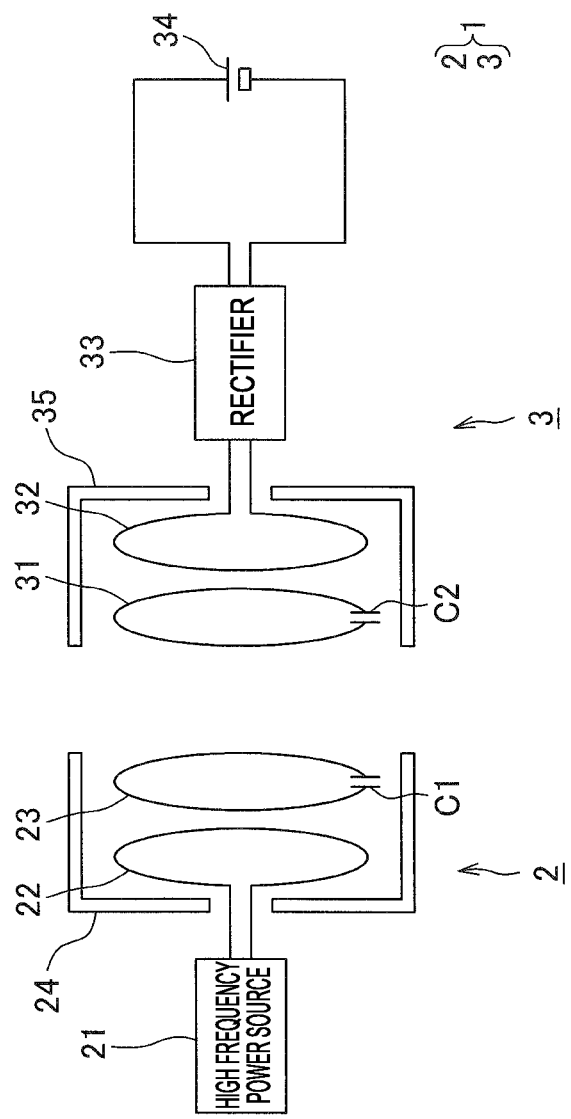
FIG. 1 is a block diagram that illustrates an embodiment of a power supply system of the present invention.
Figure 2:
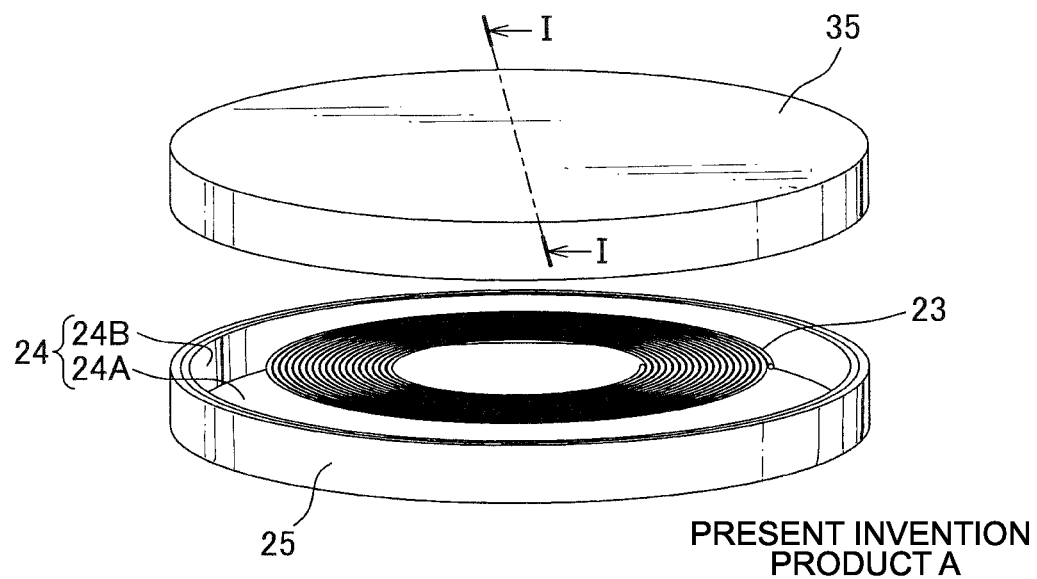
FIG. 2 is a perspective view according to a first embodiment that illustrates a power supply side shield case and a power receiving side shield case illustrated in FIG. 1.
Figure 3:
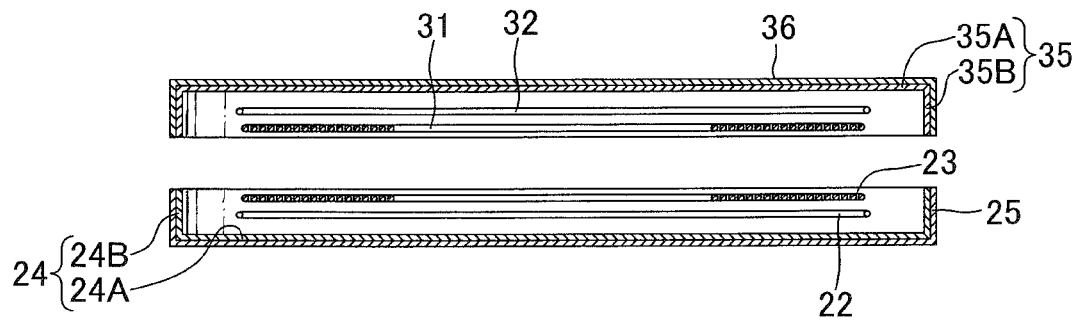
FIG. 3 is a cross-sectional view taken along line I-I of FIG. 2.

Hereinafter, a power supply system according to a first embodiment of the present invention will be described with reference to FIGS. 1 to 3. FIG. 1 is a block diagram that illustrates an embodiment of the power supply system of the present invention. FIG. 2 is a perspective view according to the first embodiment that illustrates the power supply side shield case and the power receiving side shield case illustrated in FIG. 1. FIG. 3 is a cross-sectional view taken along line I-I of FIG. 2. As illustrated in FIG. 1, a power supply system 1 is provided with a power supply unit 2 disposed to power supply equipment and a power receiving unit 3 mounted to a vehicle.

The above-described power supply unit 2 is provided with a high frequency power source 21 as a power source, a power supply side loop antenna 22 to which a high frequency power is supplied from the high frequency power source 21, a power supply side resonance coil 23 electromagnetically coupled to the power supply side loop antenna 22, a power supply side capacitor C1 connected to both ends of the power supply side resonance coil 23, and a power supply side shield case 24 housing the power supply side loop antenna 22 and the power supply side resonance coil 23.

The above-described high frequency power source 21 generates a high frequency power to supply to the power supply side loop antenna 22. It is configured that the high frequency power generated by the high frequency power source 21 is equivalent to a resonance frequency (for example, 13.56 MHz) of the power supply side resonance coil 23 and a power receiving side resonance coil 31 which are to be described later.

The above-described power supply side loop antenna 22 is configured by winding a conductive wire in a circular loop shape, and is disposed such that the central axis thereof extends along a direction facing a vehicle from a ground surface, that is, a vertical direction. The high frequency power source 21 is connected to the both ends of the power supply side loop antenna 22, and the high frequency power supplied from the high frequency power source 21 is supplied thereto.

As illustrated in FIG. 2, the power supply side resonance coil 23 is configured by winding a conductive wire around the central axis in a circular spiral shape. The power supply side resonance coil 23 is disposed to be spaced closer to the vehicle side than the above-described power supply side loop antenna 22 and further disposed on the same axis with the power supply side loop antenna 22. In addition, the power supply side resonance coil 23 is also disposed so that the central axis thereof extends along the vertical direction. Then, the power supply side capacitor C1 for adjusting a resonance frequency is connected to the both ends of the power supply side resonance coil 23.

The above-described power supply side loop antenna 22 and power supply side resonance coil 23 are provided to be spaced apart from each other in a range in which the both can be electromagnetically coupled to each other, that is, in a range in which a high frequency power is supplied to the power supply side loop antenna 22 and electromagnetic induction is generated in the power supply side resonance coil 23 when a high frequency current flows.

The power supply side shield case 24 is made of a metal shield such as copper and aluminum having a high conductivity, and is attached with a ferrite 25 as a magnetic body on an outer surface thereof as illustrated in FIGS. 2 and 3. The power supply side shield case 24 is formed of a bottom wall 24A covering a side of the power supply side loop antenna 22 and the power supply side resonance coil 23, which is spaced apart from the power receiving side resonance coil 31 to be described later, and a vertical wall 24B erecting from a periphery of the bottom wall 24A. The bottom wall 24A is provided to have a round shape with a slightly larger diameter than each diameter of the power supply side loop antenna 22 and the power supply side resonance coil 23. The vertical wall 24B is provided to surround side surfaces of the power supply side loop antenna 22 and the power supply side resonance coil 23. The ferrite 25 is attached to the entire outer surface of the above-described bottom wall 24A and vertical wall 24B.

As illustrated in FIG. 1, the above-described power receiving unit 3 is provided with the power receiving side resonance coil 31 electromagnetically resonating with the power supply side resonance coil 23, a power receiving side loop antenna 32 electromagnetically coupled to the power receiving side resonance coil 31, a power receiving side capacitor C2 connected to both ends of the power receiving side resonance coil 31, a rectifier 33 converting the high frequency power received by the power receiving side loop antenna 32 to DC power, an on-vehicle battery 34 to which the DC power converted by the rectifier 33 is supplied, and a power receiving side shield case 35 housing the power receiving side loop antenna 32 and the power receiving side resonance coil 31.

The above-described power receiving side resonance coil 31 is provided to have the same size and the same shape with the above-described power supply side resonance coil 23, and to allow a central axes thereof to extend along the vertical direction. The above-described power receiving side loop antenna 32 is provided to have the same size and the same shape with the power supply side loop antenna 22. In addition, the power receiving side loop antenna 32 is disposed to be separated apart from the ground surface than the power receiving side resonance coil 31, and further, to be on the same axis with the power receiving side resonance coil 31. The power receiving side capacitor C2 for adjusting a resonance frequency is connected to the both ends of the above-described power receiving side resonance coil 31.

In addition, the power receiving side resonance coil 31 and the power receiving side loop antenna 32 are provided to be spaced apart from each other in a range in which the both are electromagnetically coupled to each other, that is, in a range in which induction current is generated in the power receiving side loop antenna 32 when AC current flows to the power receiving side resonance coil 31.

As illustrated in FIG. 3, the power receiving side shield case 35 is made of a metal shield such as copper and aluminum having a high conductivity, similarly to the power supply side shield case 24, and is attached with a ferrite 36 as a magnetic body on an outer surface thereof. The power receiving side shield case 35 is formed of a bottom wall 35A covering a side of the power receiving side loop antenna 32 and the power receiving side resonance coil 31, which is spaced apart from the power supply side resonance coil 23 to be described later, and a vertical wall 35B erecting from a periphery of the bottom wall 35A. The bottom wall 35A is provided to have a round shape with a slightly larger diameter than each diameter of the power receiving side loop antenna 32 and the power receiving side resonance coil 31. The vertical wall 35B is provided to surround side surfaces of the power receiving side loop antenna 32 and the power receiving side resonance coil 31. The ferrite 36 is attached to the entire outer surface of the above-described bottom wall 35A and vertical wall 35B.

According to the above-described power supply system 1, when the power receiving unit 3 of the vehicle approaches the power supply unit 2 disposed to the ground surface of the power supply equipment so that the power supply side resonance coil 23 and the power receiving side resonance coils 31 electromagnetically resonate with each other, power is supplied from the power supply unit 2 to the power receiving unit 3 in a non-contact manner thereby charging the on-vehicle battery 34.

To be more specific, when the AC current is supplied to the above-described power supply side loop antenna 22, the power is sent to the power supply side resonance coil 23 by electromagnetic induction. In other words, the power is supplied to the power supply side resonance coil 23 via the power supply side loop antenna 22. When the power is sent to the power supply side resonance coil 23, the power is wirelessly sent to the power receiving side resonance coil 31 by the resonance of the magnetic fields. Further, when the power is sent to the power receiving side resonance coil 31, the power is sent to the power receiving side loop antenna 32 by the electromagnetic induction thereby charging the on-vehicle battery 34 connected to the power receiving side loop antenna 32.

According to the above-described power supply system 1, the power supply side and power receiving side resonance coils 23 and 31 are surrounded by the bottom walls 24A and 35A and the vertical walls 24B and 35B of the shield cases 24 and 35. Moreover, the ferrites 25 and 36 are provided to the bottom walls 24A and 35A and the vertical walls 24B and 35B of the shield cases 24 and 35 so that it is possible to sufficiently prevent the electromagnetic leakage even in the high-power power supply system 1 of an automobile.

In addition, according to the above-described power supply system 1, the ferrites 25 and 36 are provided onto the outer surfaces of the shield cases 24 and 35. Thus, the leakage magnetic field is converted to heat energy by the ferrites 25 and 36 before reaching the outer surface of the shield cases 24 and 35 so as to prevent an eddy current from flowing to the outer surfaces of the shield cases 24 and 35 and prevent generation of the electromagnetic noise therefrom. Accordingly, it is possible to prevent the magnetic field leakage more reliably. In addition, although the ferrites 25 and 36 become hot by absorbing an electromagnetic wave and converting it to the heat energy, it is possible to increase heat radiation effect of the ferrites 25 and 36 and to prevent it from being too hot by providing the ferrites 25 and 36 to the outer surfaces of the shield cases 24 and 35 as described above.

Second Embodiment

Next, the power supply system 1 according to a second embodiment of the present invention will be described with reference to FIGS. 4 and 5. A major difference between the first embodiment and the second embodiment is the configuration of the ferrites 25 and 36 attached to the shield cases 24 and 35. In the second embodiment, a plurality of slits 26 and 37 is provided to the ferrites 25 and 36 attached to the bottom walls 24A and 35A of the shield cases 24 and 35. The plurality of slits 26 and 37 is provided to have a round shape with different diameters from one another and disposed on a concentric circle.

According to the above-described power supply system 1, the slits 26 and 37 are provided to the ferrites 25 and 36 so that it is possible to increase surface area as compared to the first embodiment, and to achieve improvement in the heat radiation effect.

Figure 4:
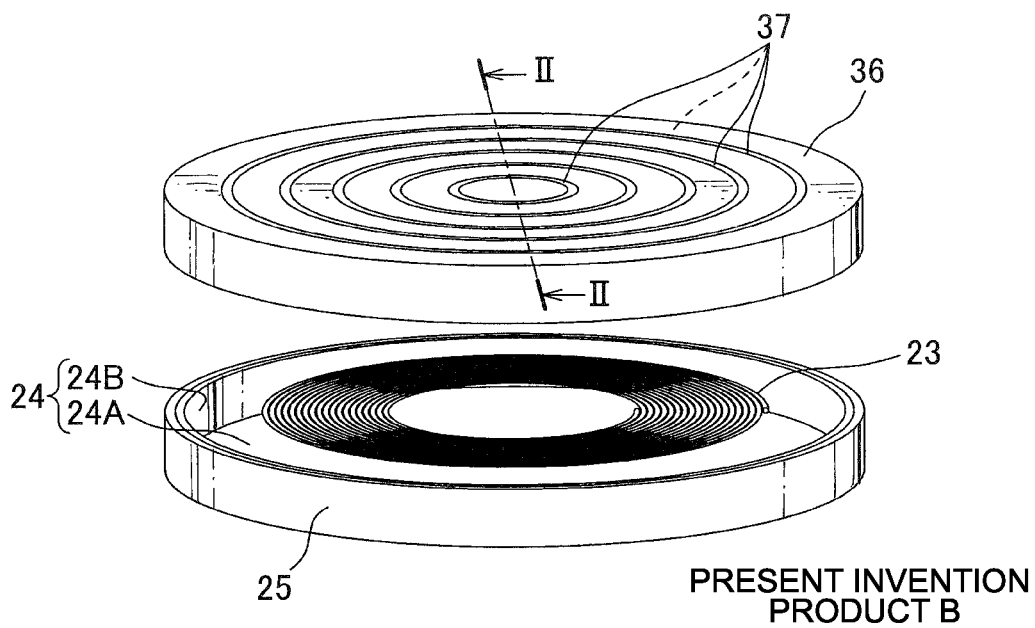
FIG. 4 is a perspective view according to a second embodiment that illustrates the power supply side shield case and the power receiving side shield case illustrated in FIG. 1.
Figure 5:
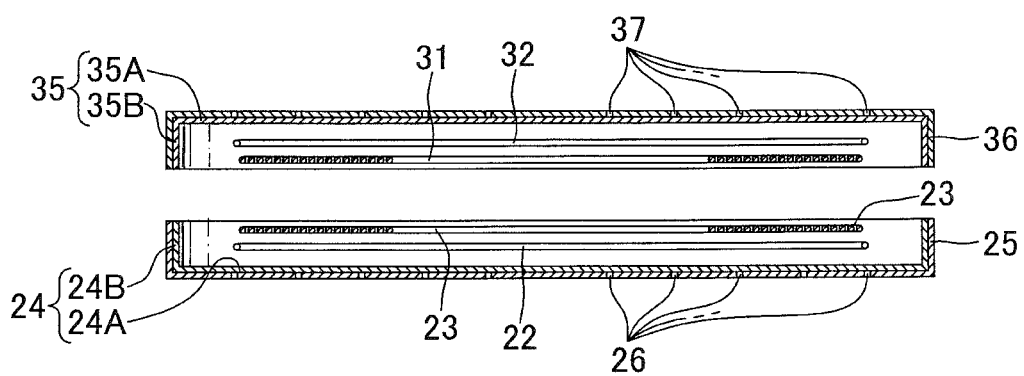
FIG. 5 is a cross-sectional view taken along line II-II of FIG. 4.
Figure 6:
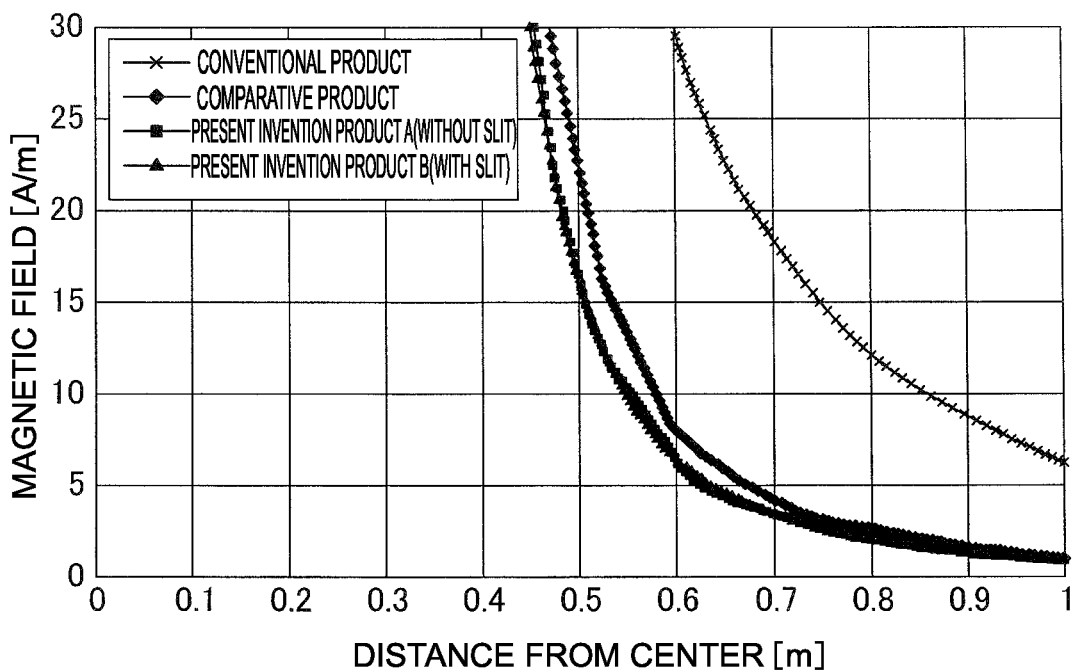
FIG. 6 is a graph that illustrates results of simulation of a leakage magnetic field with respect to a distance from the center of a resonance coil regarding on a present invention product A (without a slit) according to the first embodiment, a present invention product B (with a slit) according to the second embodiment, a comparative product in which a ferrite is not attached to the shield case illustrated in FIG. 2, and a conventional product having a shield frame and a magnetic body illustrated in FIG. 14.
Figure 14:
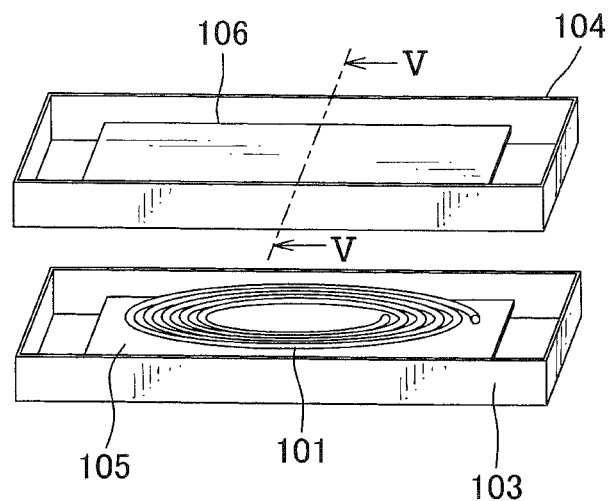
FIG. 14 is a perspective view that illustrates an example of a power supply system of the related art.
Figure 15:
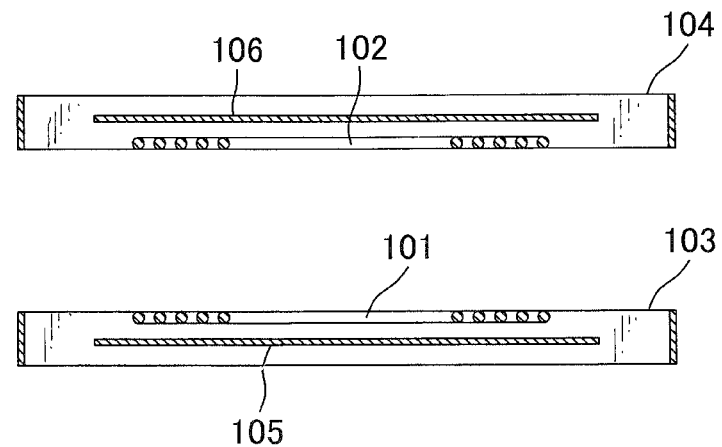
FIG. 15 is a cross-sectional view taken along line V-V of FIG. 14.

Next, the inventors of the present invention conducted simulation of the leakage magnetic field with respect to a distance from the center of the resonance coils 23 and 31 regarding on a present invention product A (without the slit) as the power supply system 1 described in the first embodiment having the shield cases 24 and 35 illustrated in FIG. 2, a present invention product B (with the slit) as the power supply system 1 described in the second embodiment having the shield cases 24 and 35 illustrated in FIG. 4, a comparative product as the power supply system 1 without the ferrites 25 and 36 being attached thereto and having the shield cases 24 and 35 illustrated in FIG. 2, and a conventional product having a shield frame 104 and a magnetic body 106 illustrated in FIG. 14. The result thereof is illustrated in FIG. 6.

Incidentally, in the simulation, a power of 3 kW is supplied to the power supply side resonance coil 23. In addition, the simulation is conducted for the present invention products A and B, and the comparative product using the same coils (same shape, same size and same material) as the respective power supply side resonance coil 23 and power receiving side resonance coil 31. In addition, a power supply side resonance coil 101 and a power receiving side resonance coil 102 of the conventional product illustrated in FIG. 14 use the same ones as the respective power supply side resonance coil 23 and power receiving side resonance coil 31 of the present invention products A and B, and the comparative product.

In addition, the simulation are conducted for the present invention products A and B, and the comparative product using the same ones as the respective power supply side loop antenna 22 and the power receiving side loop antenna 32. In addition, although the loop antenna is omitted in FIG. 14, the conventional product also has the same supply side and power receiving side loop antennas as the present invention products A and B, and the comparative product. In addition, a distance between the power supply side loop antenna 22 and each of the power supply side resonance coils 23 and 101, and a distance between the power receiving side loop antenna 32 and each of the power receiving side resonance coils 31 and 102 are identically set in the present invention products A and B, the comparative product, and the conventional product.

In addition, the shield cases 24 and 35 are identically set in the present invention products A and B, and the comparative product, and the respective arrangement of the shield cases 24 and 35, the power supply side and power receiving side loop antennas 22 and 32, and the power supply side and power receiving side resonance coils 23 and 31 is also identical to one another. In other words, a difference between the present invention product A and the present invention product B is only whether the slits 26 and 37 are present or not, and all the other parts are identically set. In addition, a difference between the present invention product A and the comparative product is only whether the ferrites 25 and 36 are present or not, and all the other parts are identically set.

In addition, shield frames 103 and 104 of the conventional product are provided in a rectangular tube shape in FIG. 14, but the simulation is conducted using a cylinder in order to be approximately the same with the shape of the vertical walls 24B and 35B of the shield cases 24 and 35. As the magnetic bodies 105 and 106 of the conventional product, a rectangular shape is employed in FIG. 14, but the simulation is conducted using a circular shape in order to be approximately the same with the shape of the ferrites 25 and 36 provided to the bottom walls 24A and 35A of the shield cases 24 and 35. In other words, a difference between the shield cases 24 and 35 of the present invention product A, and the shield frames 103 and 104 of the conventional product is whether the bottom walls 24A and 35A are present or not, and all the other part are identically set.

As illustrated in FIG. 6, it is confirmed that spreading of the leakage magnetic field distribution is suppressed in the present invention products A and B, compared to the conventional product and the comparative product. There is a guideline value defined by International Commission on Non-Ionizing Radiation Protection (ICNIRP) as a policy value of the magnetic field for human body protection, which defines that a magnetic field strength of 5 A/m or less is desirable in a range from 10 MHz to 400 MHz. It is confirmed that the magnetic field strength becomes 5 A/m or less near 0.65 m of distance in the present invention products A and B while the magnetic field strength does not become 5 A/m or less even in a range exceeding 1 m of distance from the center in the conventional product. In addition, it is confirmed that the spreading of the leakage magnetic field distribution is suppressed even when the slits 26 and 37 are provided, similarly to the case where the slits 26 and 37 are not provided.

Third Embodiment

Figure 7:
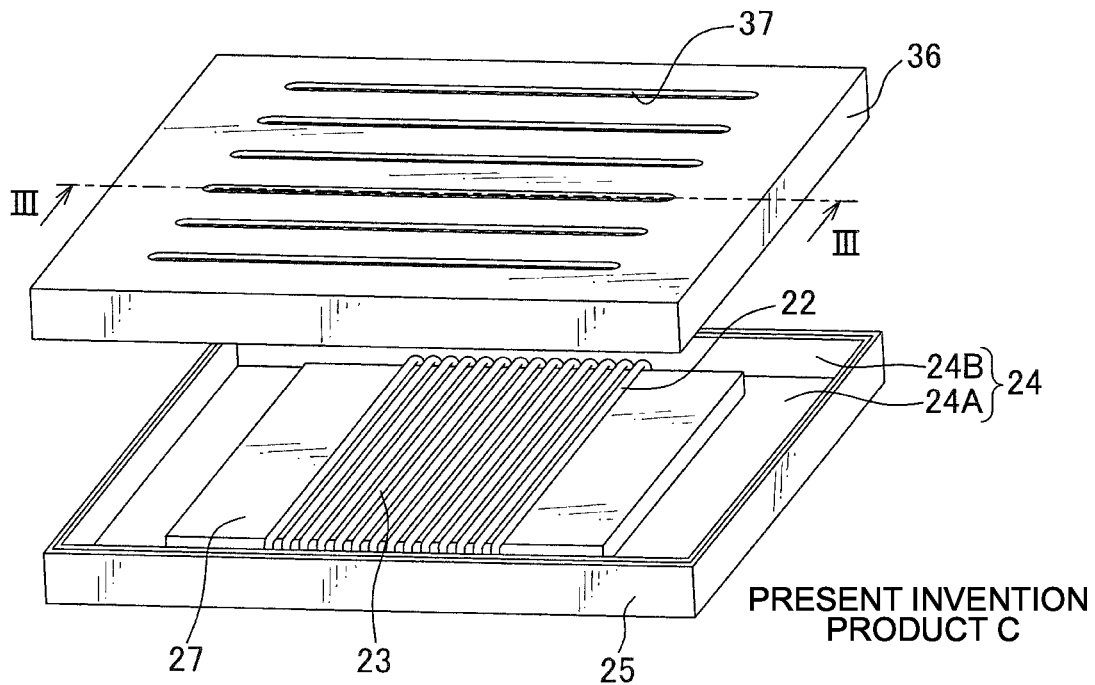
FIG. 7 is a perspective view according to a third embodiment that illustrates the power supply side shield case and the power receiving side shield case illustrated in FIG. 1.
Figure 8:
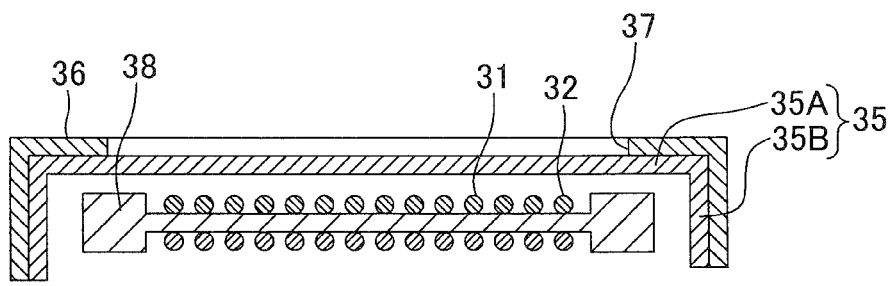
FIG. 8 is a cross-sectional view taken along line III-III of FIG. 7.

Next, the power supply system 1 according to a third embodiment of the present invention will be described with reference to FIGS. 7 to 10. A major difference between the third embodiment and the second embodiment is each configuration of the power supply side and power receiving side resonance coils 23 and 31, and the power supply side and power receiving side loop antennas 22 and 32. As illustrated in FIGS. 7, 8 and the like, the power supply side and power receiving side resonance coils 23 and 31 according to the third embodiment are provided to have the same size and the same shape, and configured by being wound helically around substantially flat cores 27 and 38 (a solenoid coil or the like).

Further, in the above-described second embodiment, the central axes of the power supply side and power receiving side resonance coils 23 and 31 are disposed to extend along the vertical direction to be on the same axis with one another. However, in the third embodiment, the central axes of the power supply side and power receiving side resonance coils 23 and 31 are disposed to be perpendicular with respect to a separation direction (perpendicular direction) of the power supply side and power receiving side resonance coils 23 and 31 at the time of supplying the power.

In addition, the power supply side and power receiving side loop antennas 22 and 32 are also configured by being wound around the substantially flat cores 27 and 38, respectively. Accordingly, the power supply side and power receiving side loop antennas 22 and 32 are disposed on the same axis with the power supply side and power receiving side resonance coils 23 and 31. The cores 27 and 38 around which the power supply side and power receiving side resonance coils 23 and 31, and the power supply side and power receiving side loop antennas 22 and 32 are wound are housed respectively in the power supply side and power receiving side shield cases 24 and 35.

In the third embodiment, the power supply side and power receiving side shield case 24 and 35 are configured of the rectangular bottom walls 24A and 35A, the vertical walls 24B and 35B erecting from the periphery of the bottom walls 24A and 35A. The ferrites 25 and 36 are attached to the entire outer surface of the bottom walls 24A and 35A, and the vertical walls 24B and 35B of the power supply side and power receiving side shield case 24 and 35, similarly to the first and second embodiments. The plurality of slits 26 and 37 is provided to the ferrites 25 and 36 on the bottom walls 24A and 35A of the shield cases 24 and 35.

Figure 9:
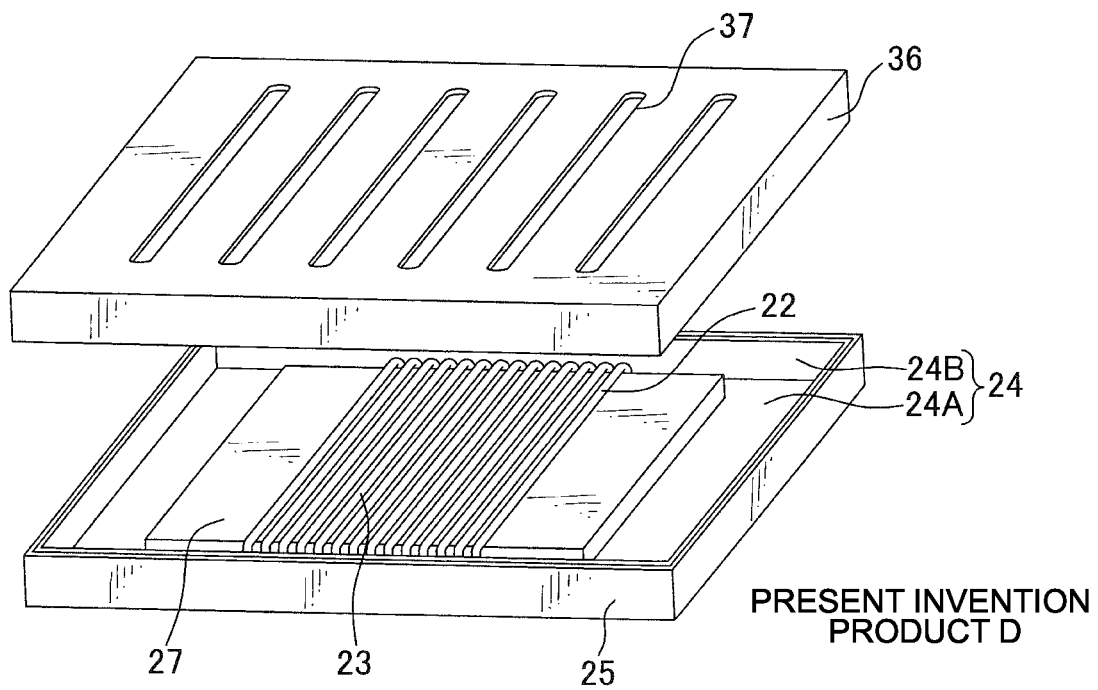
FIG. 9 is a perspective view according to the third embodiment that illustrates the power supply side shield case and the power receiving side shield case illustrated in FIG. 1.

As illustrated in FIG. 9, the plurality of slits 26 and 37 may be linearly disposed along a direction orthogonal to the central axis of the resonance coils 23 and 31 to be arranged in plural along the central axis. However, it is desirable that the slits 26 and 37 be linearly disposed along the central axis of the resonance coils 23 and 31 to be arranged along a direction orthogonal to the central axis as illustrated in FIG. 7.

Figure 10:
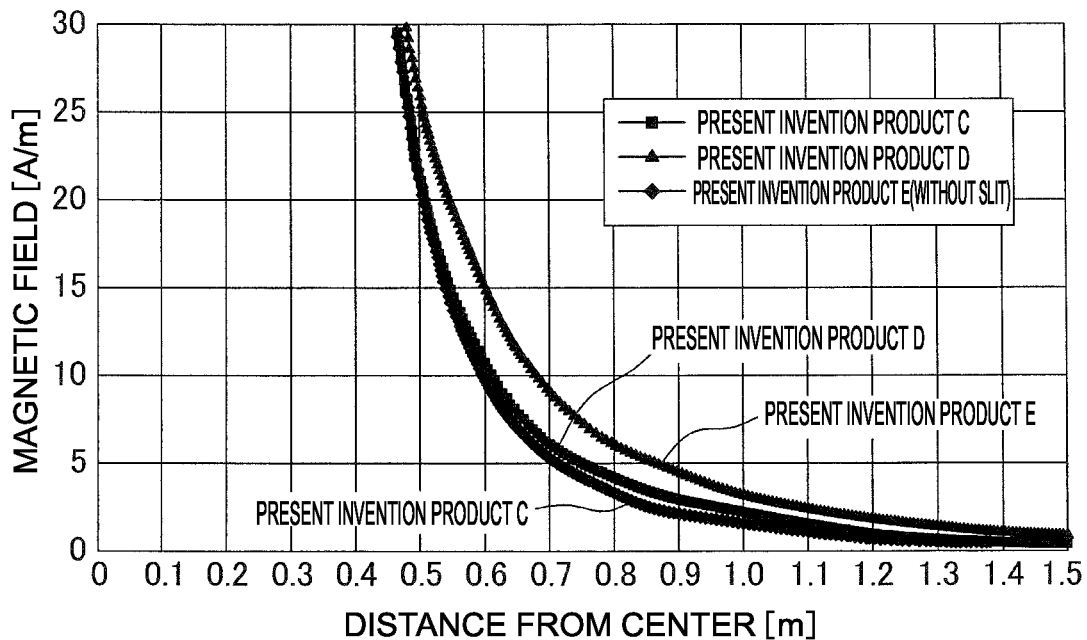
FIG. 10 is a graph that illustrates results of simulation of the leakage magnetic field with respect to the distance from the center regarding on a present invention product C in which a plurality of slits, provided to a ferrite, is linearly provided along the central axis, a present invention product D in which a plurality of slits, provided to a ferrite, is linearly provided along a direction perpendicular to the central axis, and a present invention product E in which a slit is not provided.

Next, the inventors of the present invention conducted simulation of the leakage magnetic field with respect to a distance from a center (center in the central axis direction of the resonance coils 23 and 31) in a power supply system in which the central axes of the power supply side and power receiving side resonance coils 23 and 31 are disposed to be perpendicular to the separation direction, regarding on a present invention product C in which the plurality of slits 26 and 37 is linearly provided along the central axis as illustrated in FIG. 7, a present invention product D in which the plurality of slits 26 and 37 is linearly provided along the direction orthogonal to the central axis as illustrated in FIG. 9, and a present invention product E (not illustrated) in which the slits 26 and 37 are not provided to the ferrites 25 and 36. The result thereof is illustrated in FIG. 10. Incidentally, a difference between the present invention product C and the present invention product D is only a direction of the slits 26 and 37, and the number of the slits 26 and 37 and all the other parts is identically set. In addition, a difference between the present invention product C and the present invention product E is only whether the slits 26 and 37 are present or not, and all the other parts are identically set.

As illustrated in FIG. 10, it is confirmed that the spreading of the leakage magnetic field distribution is more suppressed in the present invention product C compared to the present invention product D. It is possible to suppress the leakage magnetic field distribution in the present invention product C as approximately similarly in the present invention product E. In other words, it was confirmed that it is desirable that the slits 26 and 37 be disposed parallel to the central axis when the central axes of the power supply side and power receiving side resonance coils 23 and 31 are disposed perpendicular to the separation direction.

Fourth Embodiment

Next, the power supply system 1 according to a fourth embodiment of the present invention will be described with reference to FIGS. 11 to 13. A major difference between the fourth embodiment and the third embodiment is a part in which the ferrites 25 and 36 are provided. In the third embodiment, the ferrites 25 and 36 are attached to the entire outer surface of the bottom walls 24A and 35A and the vertical walls 24B and 35B of the shield cases 24 and 35. In contrast, in the fourth embodiment, the ferrites 25 and 36 are attached to the entire outer surface of the vertical walls 24B and 35B of the shield cases 24 and 35, but not attached to the bottom walls 24A and 35A.

Figure 11:
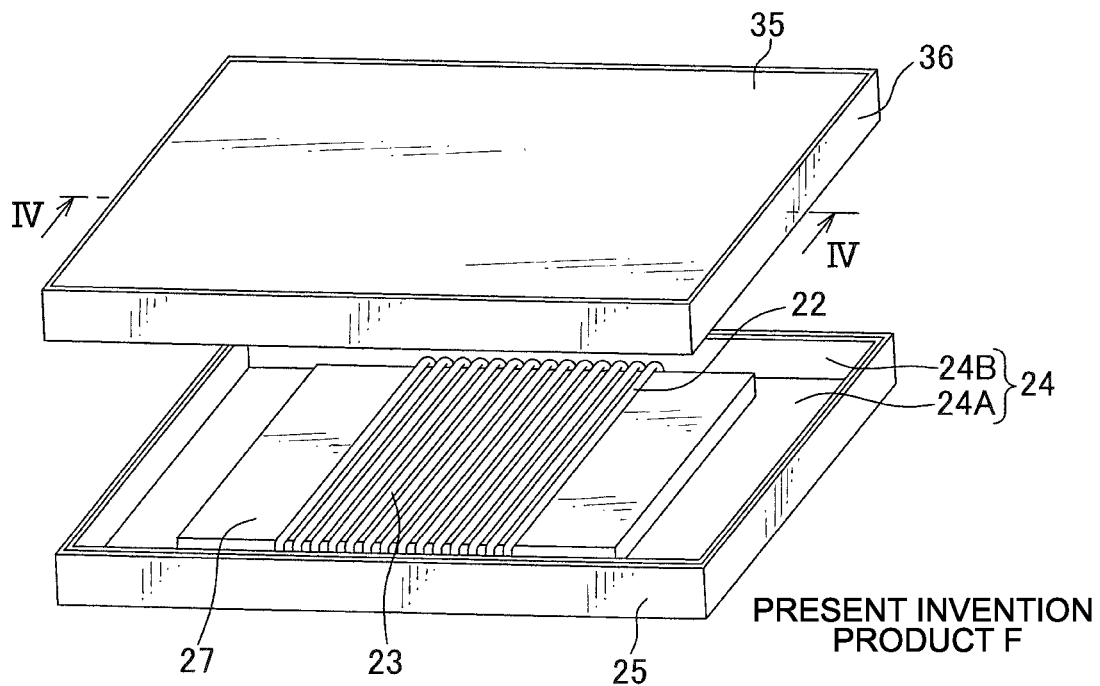
FIG. 11 is a perspective view according to a fourth embodiment that illustrates the power supply side shield case and the power receiving side shield case illustrated in FIG. 1.
Figure 12:
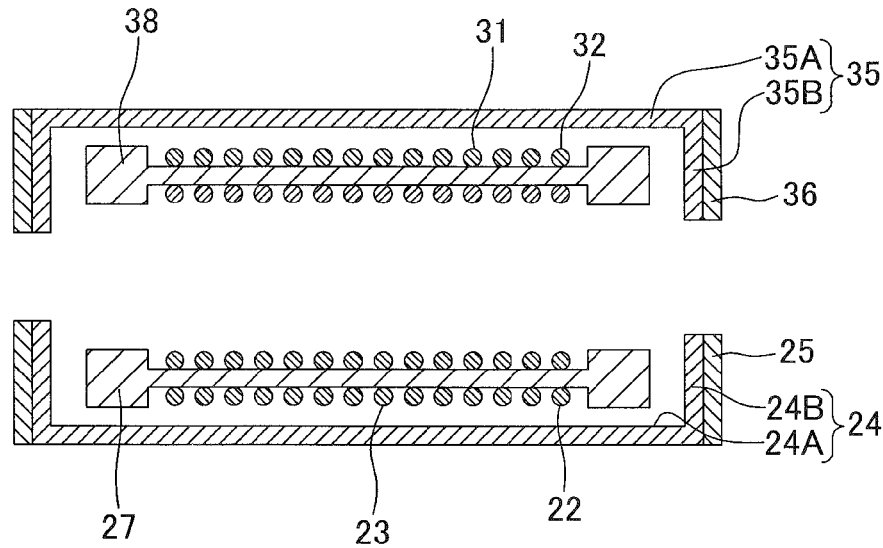
FIG. 12 is a cross-sectional view taken along line IV-IV of FIG. 10.

As illustrated in FIGS. 11 and 12, even in the case where the ferrites 25 and 36 are provided only to the vertical walls 24B and 35B, it is possible to prevent the electromagnetic leakage as much as in the case where the ferrites 25 and 36 are attached to the both of bottom walls 24A and 35A, and the vertical walls 24B and 35B. Further, it is possible to achieve reduction in weight and cost by omitting the ferrites 25 and 36 on the bottom walls 24A and 35A.

Next, the inventors of the present invention conducted simulation of the leakage magnetic field with respect to the distance from the center (center in the central axis direction of the resonance coils 23 and 31), regarding on the comparative product as the power supply system 1 having the shield cases 24 and 35 illustrated in FIG. 11, in which the ferrites 25 and 36 are not attached, the present invention product E (not illustrated) in which the ferrites 25 and 36 are attached to both the bottom walls 24A and 35A, and the vertical walls 24B and 35B, and a present invention product F illustrated in FIGS. 11 and 12, in which the ferrites 25 and 36 are attached only to the vertical walls 24B and 35B. The result thereof is illustrated in FIG. 13. Incidentally, a difference between the comparative product, and the present invention products E and F is only whether the ferrites 25 and 36 are provided or not, and all the other parts are identically set. In addition, a difference between the present invention product E and the present invention product F is only whether the ferrites 25 and 36 are attached to the bottom walls 24A and 35A or not, and all the other parts are identically set.

Figure 13:
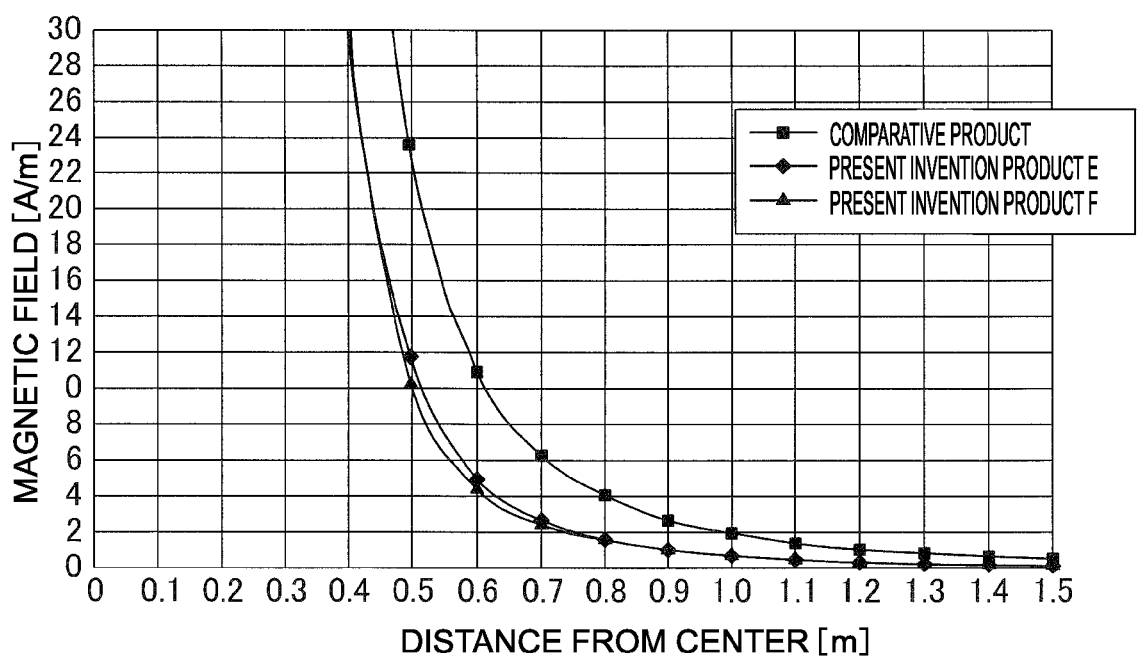
FIG. 13 is a graph that illustrates results of simulation of the leakage magnetic field with respect to the distance from the center regarding on the comparative product in which the ferrite is not attached to the shield case illustrated in FIG. 11, the present invention product E in which the ferrite is attached to both a bottom wall and a vertical wall of the shield case illustrated in FIG. 11, and a present invention product F in which the ferrite is attached only to the vertical wall of the shield case illustrated in FIG. 11.

As illustrated in FIG. 13, it is confirmed that the spreading of the leakage magnetic field distribution is suppressed more in the present invention products E and F, compared to the comparative product. In addition, it is confirmed that it is possible to suppress the leakage magnetic field distribution in the present invention product F as approximately similarly in the present invention product E.

Incidentally, in the above-described first and second embodiments, the power supply side and power receiving side resonance coils are provided in the spiral shape, but the present invention is not limited thereto. The shape of the power supply side and power receiving side resonance coils is not limited to the above-described embodiments, but may be a helical shape (a solenoid coil or the like), for example.

In addition, in the above-described embodiments, the power supply side and power receiving side resonance coils are provided to have the same size, but the present invention is not limited thereto. Any one of the power supply side and power receiving side resonance coils may be larger than the other.

In addition, according to the above-described embodiments, the ferrite is used as the magnetic body, but the present invention is not limited thereto, and other magnetic bodies may be used.

In addition, according to the above-described embodiments, the ferrite is provided to each outer surface of the power supply side and power receiving side shield cases 24 and 35, but the present invention is not limited thereto. The ferrite may be provided onto an inner surface of the power supply side and power receiving side shield cases 24 and 35.

In addition, the fourth embodiment may be applicable to the power supply system 1 according to the first embodiment illustrated in FIG. 2, for example. In other words, the ferrites 25 and 36 may be provided only to the vertical walls 24B and 35B of the shield cases 24 and 35 illustrated in FIGS. 2 and 3 so as not to provide ferrites 25 and 36 to the bottom walls 24A and 35A.

In addition, the embodiments described hereinbefore are only to illustrate a representative mode of the present invention, and the present invention is not limited to the embodiments. In other words, a variety of modification can be implemented in a scope not departing from the gist of the present invention.

REFERENCE SIGNS LIST 1 power supply system
2 power supply unit
3 power receiving unit
21 high frequency power source (power source)
23 power supply side resonance coil
31 power receiving side resonance coil
24 power supply side shield case (shield case)
24A bottom wall
24B vertical wall
25 ferrite (magnetic body)
26 slit
35 power receiving side shield case (shield case)
35A bottom wall
35B vertical wall
36 ferrite (magnetic body)
37 slit

The invention claimed is:

1. A power supply unit comprising:
a power source;
a power supply side resonance coil configured to resonance with a power receiving side resonance coil mounted to a vehicle to supply power supplied from the power source to the power receiving side resonance coil in a non-contact manner; and
a conductive shield case formed of:
a bottom wall covering a side of the power supply side resonance coil spaced apart from the power receiving side resonance coil; and
a vertical wall erecting from a periphery of the bottom wall,
wherein the power supply side resonance coil is disposed in the conductive shield case, and
wherein a magnetic body is provided onto a surface of the vertical wall of the shield case, and the magnetic body is provided onto an outer surface of the shield case.

2. A power receiving unit comprising:
a power receiving side resonance coil mounted to a vehicle and configured to electromagnetically resonate with a power supply side resonance coil to receive power from the power supply side resonance coil in a non-contact manner; and
a conductive shield case formed of;
a bottom wall covering a side of the power receiving side resonance coil spaced apart from the power supply side resonance coil; and
a vertical wall erecting from a periphery of the bottom wall,
wherein the power receiving side resonance coil is disposed in the conductive shield case, and
wherein a magnetic body is provided onto a surface of the vertical wall of the shield case, and the magnetic body is provided onto an outer surface of the shield case.

3. A power supply system comprising:
the power supply unit according to claim 1; and
a power receiving unit comprising:
a power receiving side resonance coil mounted to a vehicle and configured to electromagnetically resonate with a power supply side resonance coil to receive power from the power supply side resonance coil in a non-contact manner; and
a conductive shield case formed of;
a bottom wall covering a side of the power receiving side resonance coil spaced apart from the power supply side resonance coil; and
a vertical wall erecting from a periphery of the bottom wall,
wherein the power receiving side resonance coil is disposed in the conductive shield case, and
wherein a magnetic body is provided onto a surface of the vertical wall of the shield case, and the magnetic body is provided onto an outer surface of the shield case.

4. The power supply system according to claim 3, wherein the magnetic body is further provided to the bottom wall of the shield case.

5. The power supply system according to claim 3, wherein the magnetic body is provided with a slit.

6. The power supply system according to claim 4, wherein the magnetic body is provided with a slit.

7. The power supply system according to claim 4,
wherein the magnetic body is provided with a slit,
central axes of the power supply side resonance coil and the power receiving side resonance coil are disposed to be perpendicular to a separation direction of the power supply side resonance coil and the power receiving side resonance coil while power is being supplied, and
the slit is provided along the central axis.

* * * * *